US008929867B2

(12) United States Patent
Bhogal et al.

(10) Patent No.: US 8,929,867 B2
(45) Date of Patent: Jan. 6, 2015

(54) AUTOMATED ELECTRONIC MESSAGING TO A PERSON WITH WHOM ANOTHER FORM OF COMMUNICATION IS EXCHANGED

(75) Inventors: Kulvir Singh Bhogal, Pflugerville, TX (US); Lisa Seacat DeLuca, San Francisco, CA (US); Mark William Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 12/892,112

(22) Filed: Sep. 28, 2010

(65) Prior Publication Data
US 2012/0077469 A1 Mar. 29, 2012

(51) Int. Cl.
*H04M 3/42* (2006.01)
*H04L 12/58* (2006.01)

(52) U.S. Cl.
CPC ............... *H04L 51/16* (2013.01); *H04L 51/28* (2013.01); *H04M 3/42382* (2013.01)
USPC ........................ 455/414.1; 709/204

(58) Field of Classification Search
USPC ............... 455/414.1; 709/203, 206, 207, 217, 709/218, 219; 704/251, 270
See application file for complete search history.

(56) References Cited

U.S. PATENT DOCUMENTS

| 6,526,274 | B1 | | 2/2003 | Fickes et al. | |
|---|---|---|---|---|---|
| 7,412,392 | B1 | * | 8/2008 | Satapathy | 704/270.1 |
| 7,593,515 | B2 | | 9/2009 | Balk et al. | |
| 2002/0087634 | A1 | * | 7/2002 | Ogle et al. | 709/204 |
| 2010/0062714 | A1 | | 3/2010 | Ozaki | |
| 2012/0076291 | A1 | | 3/2012 | Bhogal et al. | |

* cited by examiner

*Primary Examiner* — Myron K Wyche
(74) *Attorney, Agent, or Firm* — Cuenot, Forsythe & Kim, LLC

(57) ABSTRACT

A method of, within an electronic messaging client that communicates using a first form of communication, receiving from a user an input identifying a tag that identifies at least one communication session corresponding to a second form of communication. The tag can be processed to identify at least one electronic messaging address associated the person with whom a communication is exchanged during the identified communication session. A recipient identifier field in the electronic messaging client can be automatically populated with the electronic messaging address. The electronic message can be communicated to the person using the electronic messaging address. The electronic messaging address also can be selected from list identifying a plurality of communication sessions corresponding to at least a second form of communication.

25 Claims, 5 Drawing Sheets

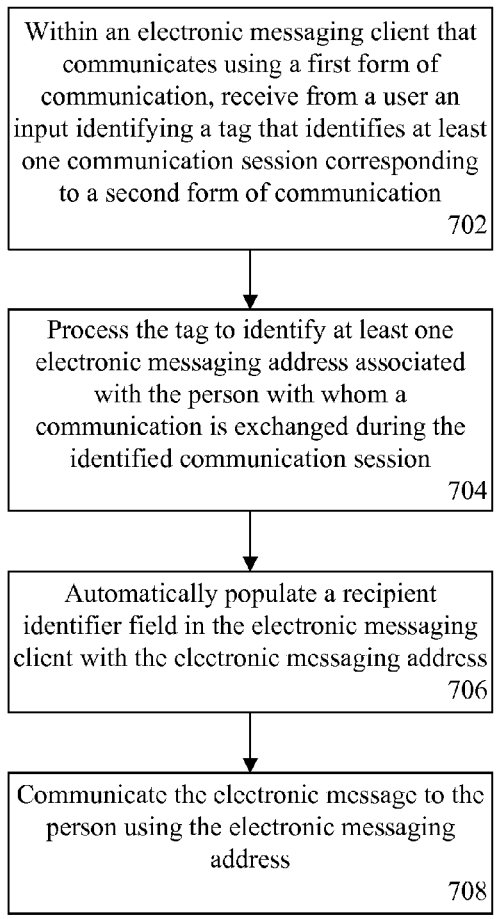
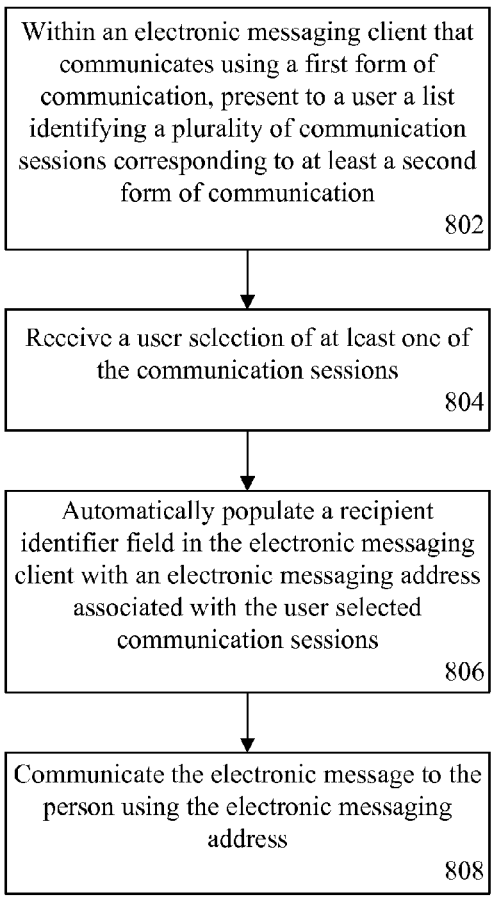
FIG. 7
FIG. 8

AUTOMATED ELECTRONIC MESSAGING TO A PERSON WITH WHOM ANOTHER FORM OF COMMUNICATION IS EXCHANGED

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments disclosed within this specification relate to integration of electronic messaging systems with other types of communication systems. More particularly, the embodiments relate to automating the sending of an electronic message to a person with whom another form of communication is exchanged.

The use of electronic messaging, for example electronic mail (e-mail) and text messaging, has grown to an extent that electronic messaging is now ubiquitous throughout most of the industrialized world. For example, approximately 80% of the U.S. population uses e-mail at least time-to-time. Nonetheless, telecommunication still is a popular means for communicating. Although most information that is verbally communicated during a telephone conversation may otherwise be communicated via e-mail or text messaging, it is often the case that speaking over the telephone is a more efficient mode for exchanging ideas. In other words, it is often quicker for people to exchange their thoughts verbally rather than in writing.

Notwithstanding, the sole use of voice telecommunications generally does not afford the parties of a telephone conversation the opportunity to exchange other forms of information. Although a participant in a telephone conversation may access an e-mail client or text messaging client to simultaneously communicate using these forms of communication while on a telephone call, the interactions required to use the e-mail client or text messaging client can be distracting, and sometimes cause the participant to lose focus on the telephone conversation.

BRIEF SUMMARY OF THE INVENTION

The embodiments disclosed within this specification relate to electronic messaging systems and, more particularly, to detecting a missing recipient of an electronic message. One embodiment of the present invention can include a method of, within an electronic messaging client that communicates using a first form of communication, receiving from a user an input identifying a tag that identifies at least one communication session corresponding to a second form of communication. The tag can be processed to identify at least one electronic messaging address associated with the person with whom a communication is exchanged during the identified communication session. A recipient identifier field in the electronic messaging client can be automatically populated with the electronic messaging address. The electronic message can be communicated to the person using the electronic messaging address.

Another embodiment of the present invention can include within an electronic messaging client that communicates using a first form of communication, presenting to a user a list identifying a plurality of communication sessions corresponding to at least a second form of communication. A user selection of at least one of the communication sessions can be received. A recipient identifier field in the electronic messaging client can be automatically populated with an electronic messaging address associated with the user selected communication session. The electronic message can be communicated to the person using the electronic messaging address.

Yet another embodiment of the present invention can include a computer program product including a computer-usable medium having computer-usable program code that, when executed, causes a machine to perform the various steps and/or functions described herein.

BRIEF DESCRIPTION OF THE SEVERAL VIEWS OF THE DRAWINGS

FIG. 7 is a flowchart for a method of automating the sending of an electronic message to a person with whom another form of communication is exchanged in accordance with one embodiment of the present invention.

FIG. 8 is a flowchart for a method of automating the sending of an electronic message to a person with whom another form of communication is exchanged in accordance with another embodiment of the present invention.

DETAILED DESCRIPTION OF THE INVENTION

Figure 1:
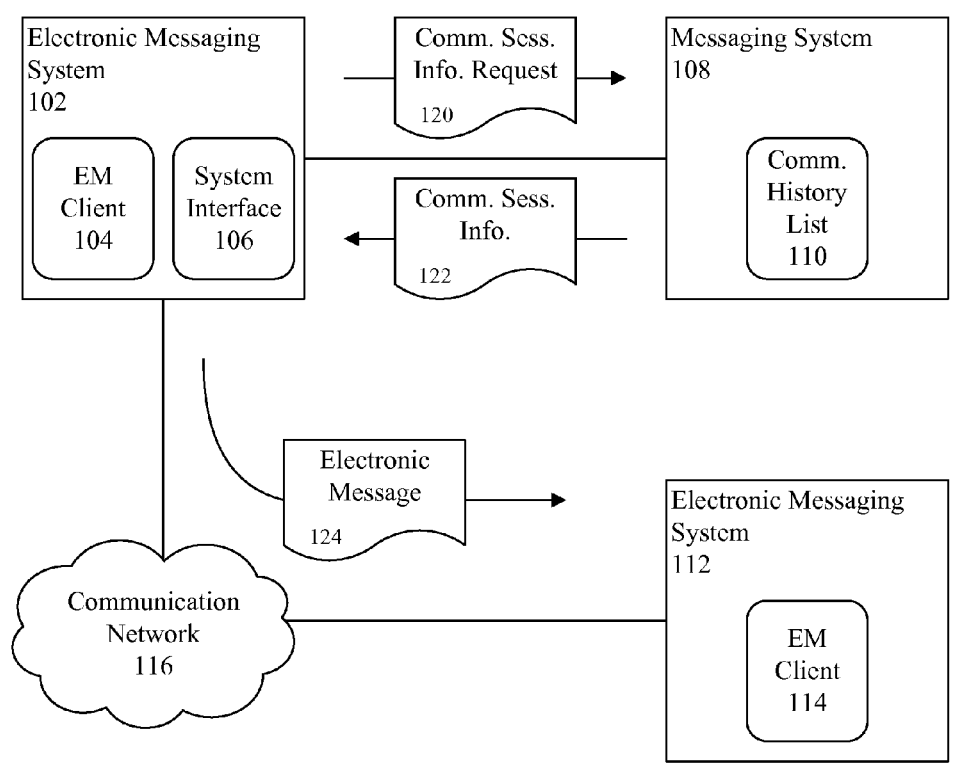
FIG. 1 is a block diagram illustrating a system for automating the sending of an electronic message to a person with whom another form of communication is exchanged in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present invention relate to integration of an electronic messaging system with telephones, telephone systems and/or other electronic messaging systems. More particularly, the embodiments relate to automating the sending of an electronic message to a person with whom communications are exchanged using another form of communication, for example during a telephone conversation or during an instant messaging session. In illustration, a user can input a tag into a recipient identifier field associated with an electronic message, for example an electronic mail (e-mail) or a text message (e.g., instant message). The tag can be processed to select an electronic messaging address associated with the person whom another form of communication is conducted, and the tag can be automatically replaced with that electronic messaging address. Data can be entered into the body of the electronic message and/or one or more files can be attached to the electronic message, and the electronic message can be sent to the person.

Accordingly, the present invention automates the task of entering an electronic message address into the recipient identifier field, thus relieving the user from the task of searching for the appropriate electronic messaging address. For example, the user can enter "current call" into the recipient identifier field, or select "current call" from a menu, and the electronic messaging address(es) for the person or persons the user is currently speaking with over the telephone can be automatically entered into the recipient identifier field. Similarly, if the user desires to send an electronic message to a person last spoken to over the telephone, the user can enter "last call" into the recipient identifier field, or select "last call" from a menu. Still, and other tags can be defined and used, and the invention is not limited in this regard.

FIG. 1 is a block diagram illustrating a system 100 for automating electronic message to a person with whom a telephone conversation is conducted in accordance with one embodiment of the present invention. The system 100 can include an electronic messaging (EM) system 102 associated with a user participating in a telephone call, or who has participated in a past telephone call. As used herein, a user is a person, such as a person using the EM client.

The EM system 102 can be a computer, a tablet computer, a personal digital assistant (PDA), or any other device having electronic messaging capabilities. In this regard, the EM system 102 can include an electronic messaging client 104, for example an e-mail client or an instant messaging client.

The EM system 102 also can include a system interface 106 that interfaces with a messaging system 108. In one embodiment, a messaging system 108 can be a telephone, for example a wired telephone, a wireless telephone, a mobile telephone, a cellular telephone, a PDA, a tablet device having telecommunication capabilities, a voice over IP (VoIP) telephone, or the like. The system interface 106 can retrieve call information from the messaging system 108, as will be described. In one aspect of the invention, the system interface 106 can communicate with the messaging system 108 via a wireless communication link, for example in accordance with a short-range wireless communication protocol such as BLUETOOTH® or ZIGBEE®.

In another arrangement, the messaging system 108 can be private branch exchange (PBX) system, and the system interface 106 can retrieve call information from the PBX system, for instance over a wired communication link. In yet another embodiment, the messaging system 108 can be system that provides another form of electronic communication. For example, the messaging system 108 also can be a computer or other device that supports VoIP communications, audio/video communications, or the like. The messaging system 108 also can be an instant messaging client. In this regard, the messaging system 108 can be integrated into the EM system 102. For example, the EM system 102 and messaging system 108 both can be integrated into a mobile telephone or PDA, or into a computer.

The messaging system 108 can store a communication history list 110, for instance on a storage medium with which the messaging system 108 is communicatively linked. The communication history list 110 can store identifiers that indicate past and current communication sessions and with whom communications were exchanged. For example, the communication history list 110 can be a call history list that identifies people whom were called, and people from whom calls were received. The calls contained on the call history list can include calls previously conducted and currently active calls. In another embodiment, the communication history list 110 can be a list of previously exchanged e-mails or instant messages. In an embodiment in which the messaging system 108 comprises an instant messaging client, the communication history list 110 can be an instant message history list. In an embodiment in which the messaging system 108 comprises an e-mail client, the communication history list 110 can be an e-mail history list.

The system also can include an EM system 112, which can be any system implemented on any of a variety of suitable systems, such as computer, PDA, mobile telephone, etc. The EM system can include an EM client 114. The EM system 102 can communicate with the EM system 112 via a communication network 116. The communication network 116 can be any form of communication network that communicatively links the EM systems 102, 112 to one another and that supports communications among the EM systems 102, 112. In illustration, the communication network 116 can comprise the Internet, a wide area network (WAN), a local area network (LAN), a mobile communications network (e.g., a cellular communications network), or any other systems through which voice, video and/or text based communications may be communicated.

Figure 2:
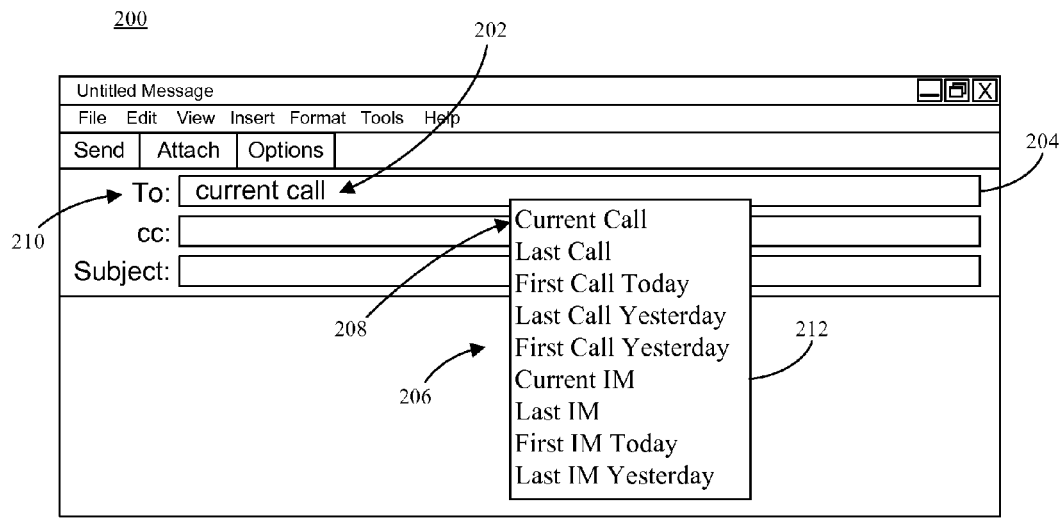
FIG. 2 is a view of an electronic message generated by an electronic messaging client in accordance with an embodiment of the present invention.
Figure 3:
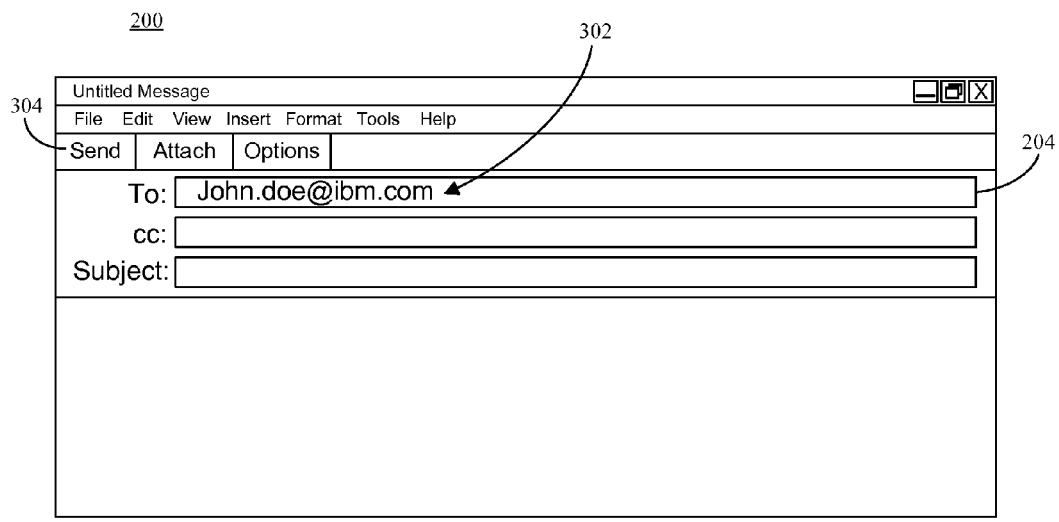
FIG. 3 is another view of the electronic message of FIG. 3.

In operation, the user can use the EM client 104 to send e-mails, instant messages, or any other form of electronic messaging. FIGS. 2 and 3 are views of an electronic message 200 generated by the EM client 104 in accordance with an embodiment of the present invention. As noted, the electronic message 200 can be an e-mail, an instant message, or any other type of electronic message.

Referring to FIG. 2, the user can input a tag 202 into a recipient identifier field 204 of the electronic message 200. For example, if the user desires to send the electronic message to a person with whom the user is currently speaking via a telephone, the user can enter "current call" to identify a current telephonic communication session. If the user desires to send the electronic message to the last person with whom the user spoke, the user can enter "last call" to identify a last communication session. Other tags can include "first call today," "last call yesterday," "current IM," "last IM," "first IM today," "last IM yesterday" "current e-mail," and "last e-mail," and so on. Still, any other tags 202 that identify a particular communication session can be entered into the recipient identifier field 204 and the invention is not limited to the actual tags that are entered. In this context, the term "tag" means a keyword or term that identifies a particular communication session based on when the communication session took place with respect when other communication sessions took place.

In one embodiment, the 202 tag may be entered directly into the recipient identifier field 204 using a keyboard, a keypad, a spoken utterance, or entered in any other suitable manner. In another embodiment, the tag can be selected from a list 206 that identifies a plurality of tags, each of which corresponds to a particular communication sessions. The user can choose to select a tag in the list 206, such as the tag 208, to identify an electronic messaging address where the electronic message 200 is to be sent. For example, the user can select a suitable icon, button, key, field or menu item to present the list 206. In illustration, the user can select the "To:" field 210 to activate a menu 212 that contains the list 206 of tags associated with the communication sessions. The menu 212 can be presented as a pop menu, a drop down menu, or can be presented in any other suitable manner.

Referring to FIGS. 2 and 3, when the tag 202 has been entered or the tag 208 has been selected from the list 206, the recipient identifier field 204 can be automatically populated with an electronic messaging address 302 corresponding to the entered tag 202 or the selected tag 208. By way of example, if the electronic message 200 is an e-mail message, and the user enters the tag "current call" into the recipient identifier field 204, or selects "Current Call" from the list 206, the recipient identifier field 204 can be automatically populated with an e-mail address of a person with whom the user is currently speaking with via a telephonic communication session. In the case where the user entered the tag 202 into the recipient identifier field 204, the tag 202 can be replaced with the electronic messaging address 302. The user can send the electronic message 200 to the electronic messaging address 302 when desired, for example by selecting a "Send" button 304, entering a particular keystroke or combination of keystrokes, or the like.

Figure 4:
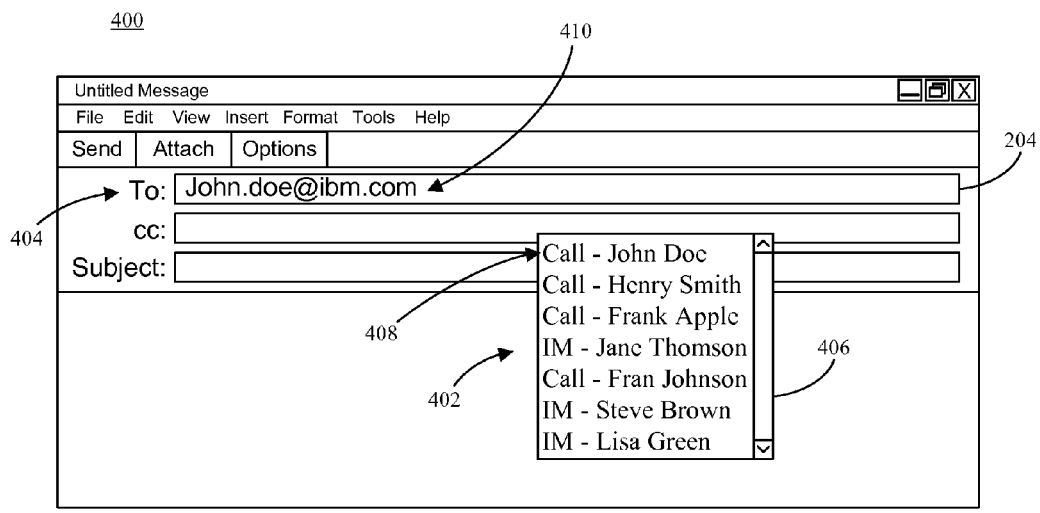
FIG. 4 is a view of an electronic message generated by an electronic messaging client in accordance with an another embodiment of the present invention.

FIG. 4 is a view of an electronic message 400 generated by an electronic messaging client in accordance an another embodiment of the present invention. The user can choose to select a communication session from a list 402 to identify an electronic messaging address where the electronic message 400 is to be sent. For example, the user can select a suitable icon, button, key, field or menu item to present the list 402. In illustration, the user can select the "To:" field 404 to activate a menu 406 that contains the list 402 of communication sessions. The menu 406 can be presented as a pop-up menu, a drop down menu, or can be presented in any other suitable manner.

The list 402 can include names of those people communicated with, user identifiers for such people, or any other indicators suitable for indicating the respective communication sessions. By way of example, in an arrangement in which the electronic message 400 is an e-mail message, the list 402 can identify instant messaging and/or telephonic communications. In arrangement in which the electronic message is an instant message, the list 402 can identify e-mail and/or telephonic communications. The list 402 can identify the type of communication sessions in any desired order, for example beginning with the last communication session. In one arrangement, the list can identify the type of communication session, for example, "call," "IM," or "e-mail," though this need not be the case. In another arrangement, the communication sessions can be grouped by their type.

When the user selects a communication session from the list 402, for example the communication session 408, an electronic messaging address 410 corresponding to the selected communication session 408 can be automatically entered into the recipient identifier field 204. For example, if the electronic message 400 is an e-mail message and the user has selected a telephonic communication session between the user and John Doe, an e-mail address associated with John Doe can be populated to the recipient identifier field 204. The user then can send the electronic message 400 to the electronic messaging address 410 when desired.

Referring again to FIG. 1, embodiments in which electronic messaging addresses are obtained will be described. When a user enters a tag into the recipient identifier field or chooses to have the list of previous communication sessions presented, via the system interface 106, the EM client 104 can communicate a communication session information request 120 to the messaging system 108. The messaging system can retrieve the requested communication session information 122 from the communication history list 110, and communicate the communication session information 122 to the EM client 104. The communication session information request 120 and communication session information can be communicated via a wired communication link or a wireless communication link. In illustration, if the messaging system 108 is a BLUETOOTH® enabled telephone, such communications can be exchanged over a BLUETOOTH® communication link.

The communication session information 122 can include data from the communication history list 110 that identifies current and/or past communication sessions. For example, the contact information can identify a person with whom communications are currently being exchanged (e.g., with whom a current telephone conversation is being conducted), and/or identify the people with whom communications were previously exchanged. The data can include user identifiers that identify the persons communicated with and/or messaging addresses (e.g., e-mail addresses, instant messaging addresses, telephone numbers, or the like) associated with the persons communicated with.

In one embodiment, the communication session information 122 can be limited to information associated with a particular number of communication sessions, or limited to information associated with communication sessions conducted within a certain period, for instance within the last day, the last two days, the last week, etc. Such limitations can be based on user settings, or determined in another suitable manner. The user settings can be established in the EM client 104 and/or the messaging system 108.

The EM client 104 can present the communication session information in the list of previous communications that are presented, or filter the communication session information to select the communication session that corresponds to a tag entered into the recipient identifier field. In another embodiment, the EM client 104 can process the tag entered into the recipient identifier field and, within the communication session information request 120, specifically identify which communication session information 122 is being requested. For example, if the entered tag is "current call," the communication session information 122 for a current telephone call can be requested, and the messaging system 108 can provide that communication session information 122.

When the communication session information 122 contains a messaging address corresponding to the requested communication session (e.g., corresponding to the tag or a selection from the communication session list), that messaging address can be entered into the recipient identifier field of the electronic message 124. When the communication session information 122 does not contain a messaging address corresponding to the requested communication session, the EM client 104 can process the communication information 122 that is received to identify the messaging address from a suitable contact list, such as a contact list contained within, or otherwise accessible to, the EM client 104. In illustration, if the communication session information 122 merely indicates a user identifier, the EM client 104 can process the user identifier to obtain a corresponding messaging address contained in the contact list. Regardless of how the messaging address is obtained, once it is obtained and the user has selected to send the electronic message 124, the electronic message 124 can be communicated to the EM client 114 corresponding to the messaging address.

Figure 5:
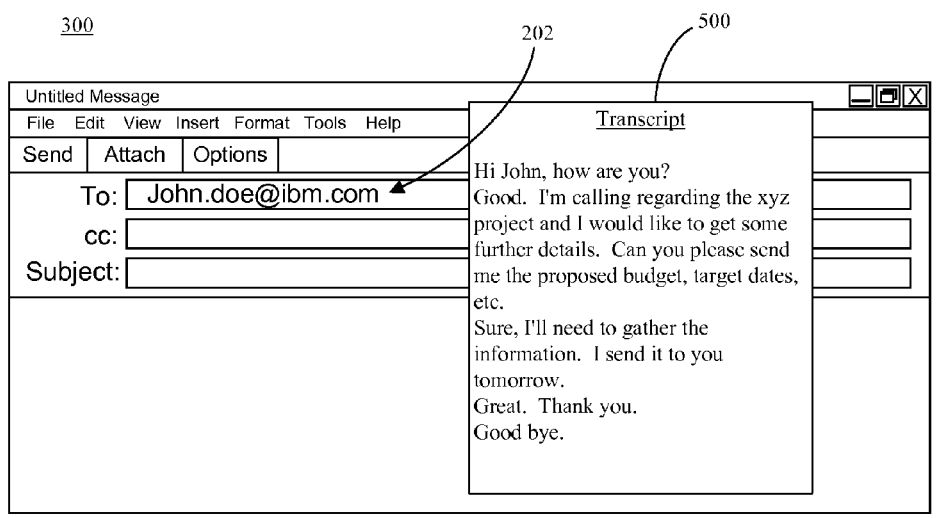
FIG. 5 is a view of a prior communication transcript generated by an electronic messaging client in accordance with an another embodiment of the present invention.

FIG. 5 is a view of a transcript 500 of a prior communication session generated by an electronic messaging client in accordance with an another embodiment of the present invention. The transcript 500 can be presented with the electronic message 300 (or electronic message 400) previously described. For example, the transcript 500 can be presented in a pop up window, within the electronic message 300 (e.g., within the body of the electronic message, within a dedicated field within the electronic message, etc.), or the transcript 500 can be presented in any other desired manner.

The transcript 500 can correspond to the communication session associated with the tag entered tag 202 of FIG. 2, the selected tag 208 of FIG. 2, or the selected communication session 408 of FIG. 4. More particularly, when the tag 202 is entered or the tag 208 is selected, the transcript 500 can be presented to display the content of the corresponding communication session. Similarly, when the communication session 408 is selected, the transcript 500 can be presented to display the content of that communication session. Accordingly, the user can be conveniently reminded about the content of the prior communication when generating the electronic message 300, 400.

In illustration, if the prior communication session is an electronic message, the transcript 500 can present that electronic message. In one embodiment, only the body of the electronic message need be presented. In another embodiment, contextual from the electronic message also can be presented. Examples of such contextual information include, but are not limited to, the time the message was sent, from whom the message was sent, to whom the message was sent, delivery status information, metadata, etc.

If the prior communication session was an audio or audio/video conversation, the transcript 500 can present a text version of the conversation. For example, in one embodiment, speech recognition can be performed on a recording of the conversation to generate a text corresponding to the content of the conversation, and this text can be presented in the transcript 500. In another embodiment, speech recognition can be performed during the conversation, and the resulting text can be stored to a suitable storage medium. That text can be retrieved when the transcript is to be presented.

Figure 6:
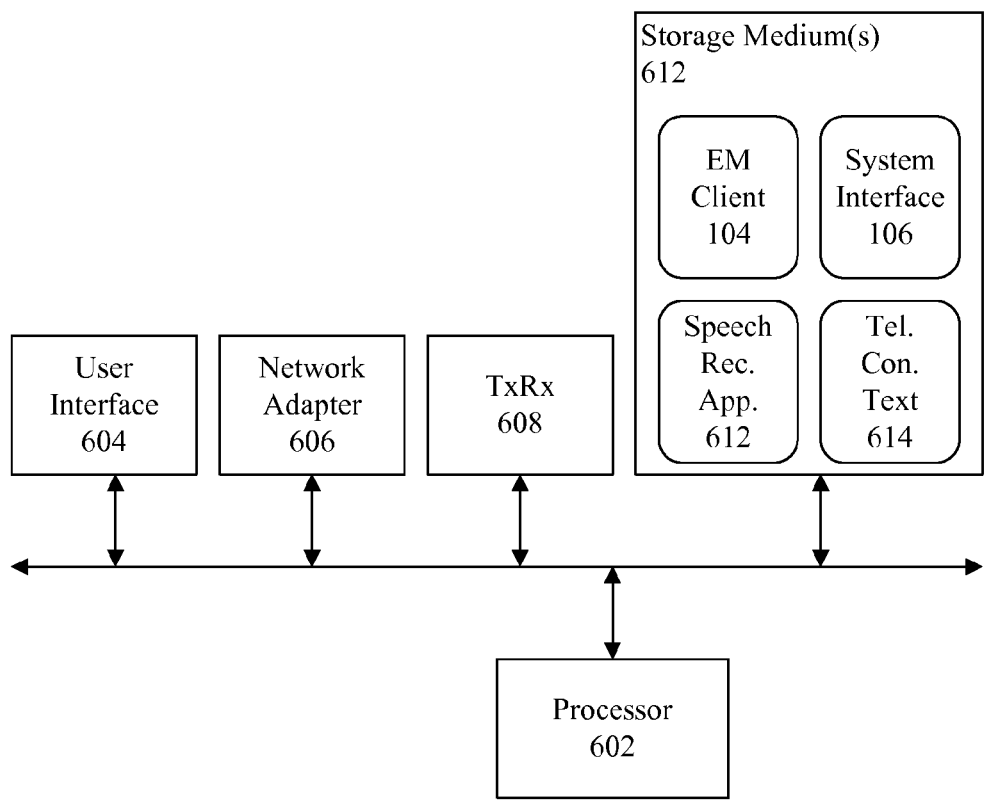
FIG. 6 is a block diagram of an electronic messaging system in accordance with an embodiment of the present invention.

FIG. 6 is a block diagram of an electronic messaging system 102 in accordance with an embodiment of the present invention. The electronic messaging system 102 can include at least one processor 602 coupled to a user interface 604, a network adapter 606, a wireless communication transceiver 608, and at least one storage medium 610, for example through a system bus and/or a communication network.

The user interface 604 can comprise, for example, a display, a mouse, loudspeakers and/or any other devices that present the EM client 104 and other information to a user, and receive information from a user. Modems, cable modems, and Ethernet cards are examples of different types of network adapters 606 that can be used with the electronic messaging system 102, but the present invention is not limited to these specific examples. The transceiver 608 can be configured to communicate with a wireless telephone, for example using a short range communication protocol such as BLUE-TOOTH® or ZIGBEE®.

The electronic messaging system 102 can store program code and data within the storage medium(s) 610, and retrieve computer program code and data from the storage medium(s) 610. The processor 602 can execute the program code accessed from storage medium(s) 610. In one aspect, for example, the electronic messaging system 102 can be implemented as computer that is suitable for storing and/or executing program code. It should be appreciated, however, that electronic messaging system 102 can be implemented in the form of any system comprising one or more processors and memory that is capable of performing the functions described within this specification. Moreover, the electronic messaging system 102 can be distributed among one or more devices. For example, the electronic messaging system 102 can be distributed among one or more computing systems located in different locations.

The electronic messaging system 102 also can include one or more cache memories (not shown) that provide temporary storage of at least some program code in order to reduce the number of times program code must be retrieved from bulk storage device during execution. The electronic messaging system 102 also can include one or more network adapters (not shown), that enable the electronic messaging system 102 to become coupled to other systems.

As pictured in FIG. 6, the storage medium(s) 610 can store the EM client 104, which may be implemented in the form of executable program code. The EM client 104 can be executed by the processor 602 and/or executed by another processor communicatively linked to the electronic messaging system 102. The storage medium(s) 610 further can the system interface 106 to communicate with another messaging system, for example as previously described, and a speech recognition application 612.

The speech recognition application can perform speech recognition for an ongoing audio or audio/video conversation or on a recording of such a conversation to generate corresponding text 614, which also may be stored to the storage medium(s) 610. The electronic messaging system 102 can receive audio of the conversation from the messaging system 108 of FIG. 1 via the network adapter 606 or the transceiver 608. In another embodiment, the speech recognition application 612 can be stored on the messaging system 108, and the text 614 of the audio conversation can be communicated to the electronic messaging system 102 via the network adapter 606 or the transceiver 608. The system interface 106 can interface with the network adapter 606 or the transceiver 608 to establish the communication link to the messaging system 108 using an appropriate communication protocol.

FIG. 7 is a flowchart for a method 700 of automating the sending of an electronic message to a person with whom another form of communication is exchanged in accordance with one embodiment of the present invention. At step 702, within an electronic messaging client that communicates using a first form of communication, a user an input can be received. The user input can identify a tag that identifies at least one communication session corresponding to a second form of communication. At step 704, the tag can be processed to identify at least one electronic messaging address associated with the person with whom a communication is exchanged during the identified communication session. At step 706, a recipient identifier field in the electronic messaging client can be automatically populated with the electronic messaging address. At step 708, the electronic message can be communicated to the person using the electronic messaging address.

FIG. 8 is a flowchart for a method 800 of automating the sending of an electronic message to a person with whom another form of communication is exchanged in accordance with one embodiment of the present invention. At step 802, within an electronic messaging client that communicates using a first form of communication, a list identifying a plurality of communication sessions corresponding to at least a second form of communication can be presented to a user. At step 804, a user selection of at least one of the communication sessions can be received. At step 806, a recipient identifier field in the electronic messaging client can be automatically populated with an electronic messaging address associated with the user selected communication sessions. At step 808, the electronic message can be communicated to the person using the electronic messaging address.

Like numbers have been used to refer to the same items throughout this specification, where appropriate. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of automating electronic messaging to a person with whom communications are exchanged using another form of communication, the method comprising:
    within an electronic messaging client that communicates using a first form of communication, receiving from a user an input identifying a tag that identifies at least one communication session corresponding to a second form of communication;
    processing the tag to identify at least one electronic messaging address associated with the person with whom a communication is exchanged during the identified communication session corresponding to the second form of communication;
    automatically populating, via a processor, a recipient identifier field in the electronic messaging client with the electronic messaging address; and
    communicating the electronic message to the person using the electronic messaging address.

2. The method of claim 1, wherein receiving the user input comprises receiving a user input of the tag into the recipient identifier field.

3. The method of claim 1, further comprising:
    presenting to the user a list comprising a plurality of tags;
    wherein receiving the user input comprises receiving a user selection of at least one tag presented in the list of tags.

4. The method of claim 1, wherein processing the tag to identify at least one electronic messaging address comprises:
    establishing a communication link with a telephone;
    retrieving from the telephone, over the communication link, information corresponding to the person with whom a telephone conversation is conducted; and
    processing the information to select the electronic messaging address.

5. The method of claim 4, wherein establishing the communication link with the telephone comprises:
    establishing a wireless communication link with the telephone.

6. The method of claim 4, wherein:
    the telephone conversation is a presently active telephone conversation in which the user is communicating with the person; and
    the tag identifies the presently active telephone conversation.

7. The method of claim 4, wherein:
    the telephone conversation is a last telephone conversation in which the user communicated with the person; and
    the tag identifies the last telephone conversation.

8. The method of claim 1, wherein processing the tag to identify at least one electronic messaging address comprises:
    establishing a communication link with a second electronic messaging system corresponding to the second form of communication;
    retrieving from the second electronic messaging system, over the communication link, information corresponding to the person with whom an electronic communication session is conducted; and
    processing the information to select the electronic messaging address.

9. The method of claim 1, further comprising:
    via the processor, presenting a transcript of the communication session.

10. A method of automating electronic messaging to a person with whom communications are exchanged using another form of communication, the method comprising:
    within an electronic messaging client that communicates using a first form of communication, presenting to a user a list identifying a plurality of communication sessions corresponding to at least a second form of communication;
    receiving a user selection of at least one of the communication sessions;
    automatically populating, via a processor, a recipient identifier field in the electronic messaging client with an electronic messaging address associated with the user selected communication session; and
    communicating the electronic message to the person using the electronic messaging address.

11. The method of claim 10, wherein presenting to the user the list identifying the plurality of communication sessions comprises presenting a list identifying a plurality of telephonic communication sessions.

12. The method of claim 10, wherein presenting to the user the list identifying the plurality of communication sessions comprises presenting a list identifying a plurality of electronic messaging communication sessions.

13. The method of claim 10, wherein presenting to the user the list identifying the plurality of communication sessions comprises presenting a list identifying a plurality of telephonic communication sessions and a plurality of electronic messaging communication sessions.

14. A computer program product comprising:
    a computer readable storage device, wherein the computer readable storage device is not a transitory, propagating signal per se, having stored thereon computer readable program code that, when executed by a system comprising a processor and a memory, automating electronic messaging to a person with whom communications are exchanged using another form of communication, the computer readable storage device comprising:
    computer readable program code that within an electronic messaging client that communicates using a first form of communication, receives from a user an input identifying a tag that identifies at least one communication session corresponding to a second form of communication;
    computer readable program code that processes the tag to identify at least one electronic messaging address associated with the person with whom a communication is exchanged during the identified communication session corresponding to the second form of communication;
    computer readable program code that automatically populates a recipient identifier field in the electronic messaging client with the electronic messaging address; and
    computer readable program code that outputs communicates the electronic message to the person using the electronic messaging address.

15. The computer program product of claim 14, wherein receiving the user input comprises receiving a user input of the tag into the recipient identifier field.

16. The computer program product of claim 14, wherein the computer readable storage device further comprises:
    computer readable program code that presents to the user a list comprising a plurality of tags;
    wherein computer readable program code that receives the user input comprises computer readable program code that receives a user selection of at least one tag presented in the list of tags.

17. The computer program product of claim 14, wherein the computer readable program code that processes the tag to identify at least one electronic messaging address comprises:
   computer readable program code that establishes a communication link with a telephone;
   computer readable program code that retrieves from the telephone, over the communication link, information corresponding to the person with whom a telephone conversation is conducted; and
   computer readable program code that processes the information to select the electronic messaging address.

18. The computer program product of claim 17, wherein the computer program code that establishes the communication link with the telephone comprises:
   computer program code that establishes a wireless communication link with the telephone.

19. The computer program product of claim 17, wherein:
   the telephone conversation is a presently active telephone conversation in which the user is communicating with the person; and
   the tag identifies the presently active telephone conversation.

20. The computer program product of claim 17, wherein:
   the telephone conversation is a last telephone conversation in which the user communicated with the person; and
   the tag identifies the last telephone conversation.

21. The computer program product of claim 14, wherein the computer program code that processes the tag to identify at least one electronic messaging address comprises:
   computer program code that establishes a communication link with a second electronic messaging system corresponding to the second form of communication;
   computer program code that retrieves from the second electronic messaging system, over the communication link, information corresponding to the person with whom an electronic communication session is conducted; and
   computer program code that processes the information to select the electronic messaging address.

22. The computer program product of claim 14, wherein the computer readable storage device further comprises:
   computer readable program code that presents a transcript of the communication session.

23. A computer program product comprising:
   a computer readable storage device, wherein the computer readable storage device is not a transitory, propagating signal per se, having stored thereon computer readable program code that, when executed by a system comprising a processor and a memory, automating electronic messaging to a person with whom communications are exchanged using another form of communication, the computer readable storage device comprising:
   computer readable program code that, within an electronic messaging client that communicates using a first form of communication, presents to a user a list identifying a plurality of communication sessions corresponding to at least a second form of communication;
   computer readable program code that receives a user selection of at least one of the communication sessions;
   computer readable program code that automatically populates a recipient identifier field in the electronic messaging client with an electronic messaging address associated with the user selected communication session; and
   computer readable program code that communicates the electronic message to the person using the electronic messaging address.

24. The computer program product of claim 23, wherein the computer readable program code that presents to the user the list identifying the plurality of communication sessions comprises computer readable program code that presents a list identifying a plurality of telephonic communication sessions.

25. The computer program product of claim 23, wherein the computer readable program code that presents to the user the list identifying the plurality of communication sessions comprises computer readable program code that presents a list identifying a plurality of electronic messaging communication sessions.

\* \* \* \* \*